United States Patent [19]

van Schaik et al.

[11] Patent Number: 5,190,000

[45] Date of Patent: Mar. 2, 1993

[54] ROCKER ARM ASSEMBLY

[75] Inventors: Peter J. van Schaik; Marko Valcic, both of Toronto, Canada

[73] Assignee: Van-Rob Stampings Inc., Scarborough, Canada

[21] Appl. No.: 851,837

[22] Filed: Mar. 16, 1992

[30] Foreign Application Priority Data

Mar. 5, 1992 [CA] Canada ............................. 2062321

[51] Int. Cl.$^5$ ............................................. F01L 1/18
[52] U.S. Cl. .............................. 123/90.39; 123/90.41; 74/519; 74/559; 384/2
[58] Field of Search ............... 123/90.39, 90.41, 90.42; 74/519, 559; 384/2

[56] References Cited

U.S. PATENT DOCUMENTS

| | | | |
|---|---|---|---|
| 3,359,959 | 12/1967 | Rose | 123/90.42 |
| 3,614,943 | 10/1971 | Schley | 123/90.42 |
| 4,314,732 | 2/1982 | Murphy | 123/90.41 |
| 4,440,121 | 4/1984 | Clancy et al. | 123/90.39 |
| 4,577,911 | 3/1986 | Fredericksen et al. | 384/2 |
| 4,718,379 | 1/1988 | Clark | 123/90.39 |

FOREIGN PATENT DOCUMENTS

2082718 3/1982 United Kingdom ............. 123/90.39

Primary Examiner—E. Rollins Cross
Assistant Examiner—Weilun Lo
Attorney, Agent, or Firm—Riches, McKenzie & Herbert

[57] ABSTRACT

The present invention provides a rocker arm assembly for an internal combustion engine comprising an elongate rocker arm having a pushrod engaging portion proximate one end, a valve stem engaging portion proximate its other end, and a socket-forming recess inbetween the ends with an aperture therethrough, retaining stud means extending through the aperture, part-ball-means retained on the stud means within the socket-forming recess forming with the recess a ball-in-socket type coupling of the rocker arm and stud means for relative articulated movement, the improvement wherein a plurality of ball bearings are arranged in a part spherical array to bear loading beteeen the recess and the part-ball means. By providing either of the recess or the part-ball member with a part spherical bearing surface, the ball bearings may be coupled to the other in a spherical array. Preferably, the ball bearings may be carried in a ring-like frustospherical raceway to protrude from both inwardly and outwardly directed surfaces of the raceway into engagement with frustospherical bearing surfaces both formed in the recess and on the part-ball member.

21 Claims, 7 Drawing Sheets

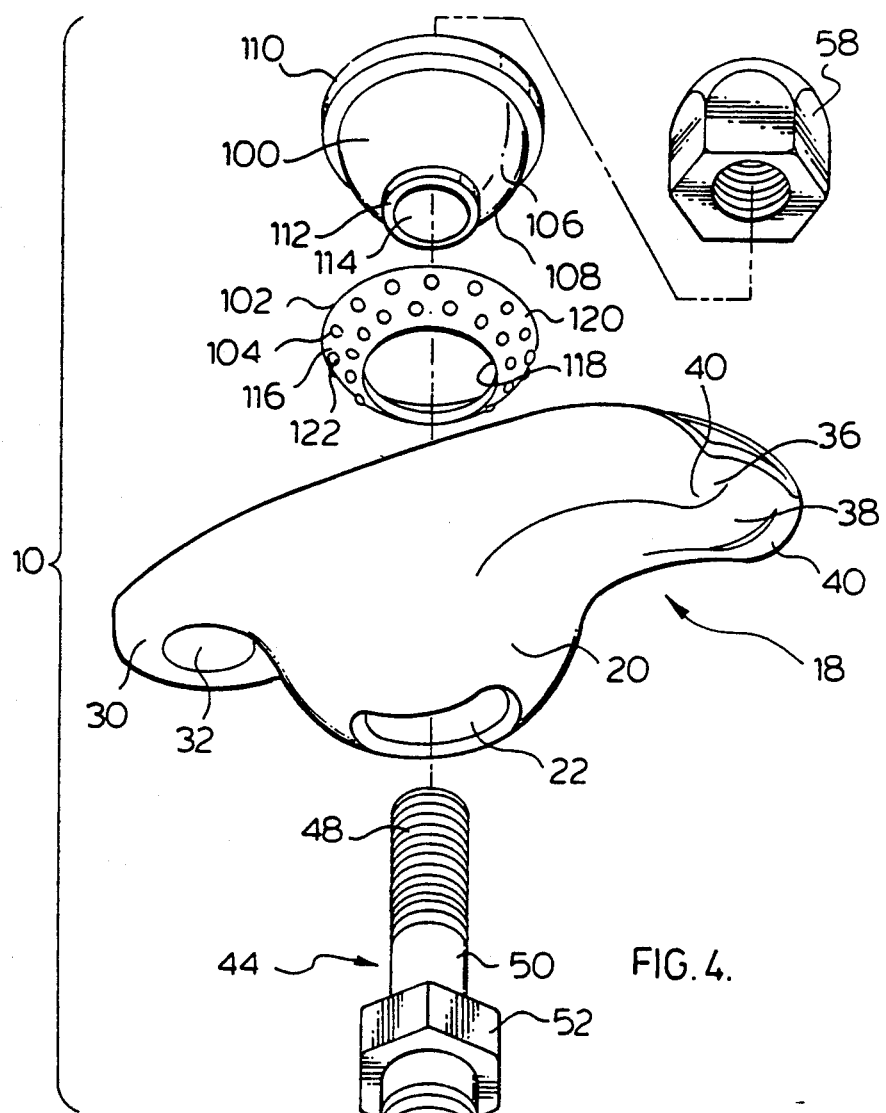
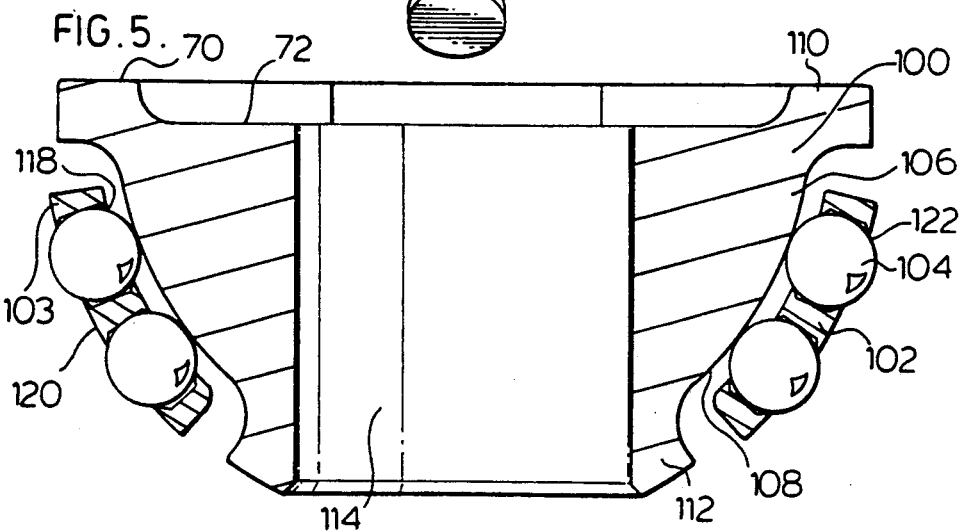

ROCKER ARM ASSEMBLY

FIELD OF THE INVENTION

This invention relates to a rocker arm assembly of use in valve control in internal combustion engines and, more particularly, to a rocker arm assembly having an improved rocker arm bearing arrangement.

BACKGROUND OF THE INVENTION

Rocker arm assemblies are well known in internal combustion engines to combat opening and closing of valves to permit gases to enter or exit a combustion engine. The rocker arm serves to pivot to couple and transfer the reciprocal movement of a pushrod to the corresponding reciprocal movement of a valve stem.

Known rocker arm assemblies which use a ball-in-socket type of juncture suffer the disadvantage of excessive frictional forces and wear between metal surfaces in the socket-forming member metal surfaces of the ball-forming member.

To reduce the friction associated with such ball-in-socket type of rocker arm assemblies, more expensive rocker arm assemblies have been provided with the rocker arm journalled for rotation about an axis. Such fixedly journalled rocker arm assemblies as are used in high performance engines suffer the disadvantage that they do not allow for slight pivoting or yawing of the rocker arm assembly about an axis perpendicular to the journal axis as is advantageous to compensate for slight angulation of a valve stem when it contacts the rocker arm.

SUMMARY OF THE INVENTION

To at least partially overcome these disadvantages of previous rocker arm assemblies, the present invention provides a rocker arm assembly having a ball-in-socket type arrangement in which ball bearings are arranged in a part spherical array between the ball-forming element and the socket-forming element.

It is an object of the present invention to provide a rocker arm assembly having an improved bearing arrangement to provide more efficient contact between articulating mechanical parts to provide improved power efficiency.

It is a further object of the present invention to provide a rocker arm assembly which reduces the wear of articulating mechanical parts.

It is a still further object of the present invention to provide a rocker arm bearing which may be retrofitted to existing engines to provide an improved bearing arrangement between articulating mechanical parts.

Accordingly, in one aspect, the present invention provides a rocker arm assembly for an internal combustion engine comprising:

an elongate rocker arm having a pushrod engaging portion proximate one end, a valve stem engaging portion proximate its other end, and a socket-forming recess inbetween the ends with an aperture therethrough, retaining stud means extending through the aperture, part-ball-means retained on the stud means within the socket-forming recess and forming with the recess a ball-in-socket type coupling of the rocker arm and stud means for relative articulated movement, the improvement wherein a plurality of ball bearings are arranged in a part spherical array to bear loading between the recess and the part-ball means. By providing either of the recess or the part-ball member with a part spherical bearing surface, the ball bearings may be coupled to the other in a spherical array. Preferably, the ball bearings may be carried in a ring-like frustospherical raceway to protrude from both inwardly and outwardly directed surfaces of the raceway into engagement with frustospherical bearing surfaces both formed in the recess and on the part-ball member.

BRIEF DESCRIPTION OF THE DRAWINGS

Further aspects and advantages will now become apparent from the following description of preferred embodiments having regard to the accompanying drawings in which:

FIG. 4 is an exploded, perspective view of a first embodiment of a rocker arm assembly according to the invention;

FIG. 5 is a schematic cross-sectional side view of the bearing race and bearing ring shown in FIG. 4;

Throughout all the drawings and disclosure, similar parts are indicated by the same reference numerals.

DESCRIPTION OF A PREFERRED EMBODIMENT

Figure 1:
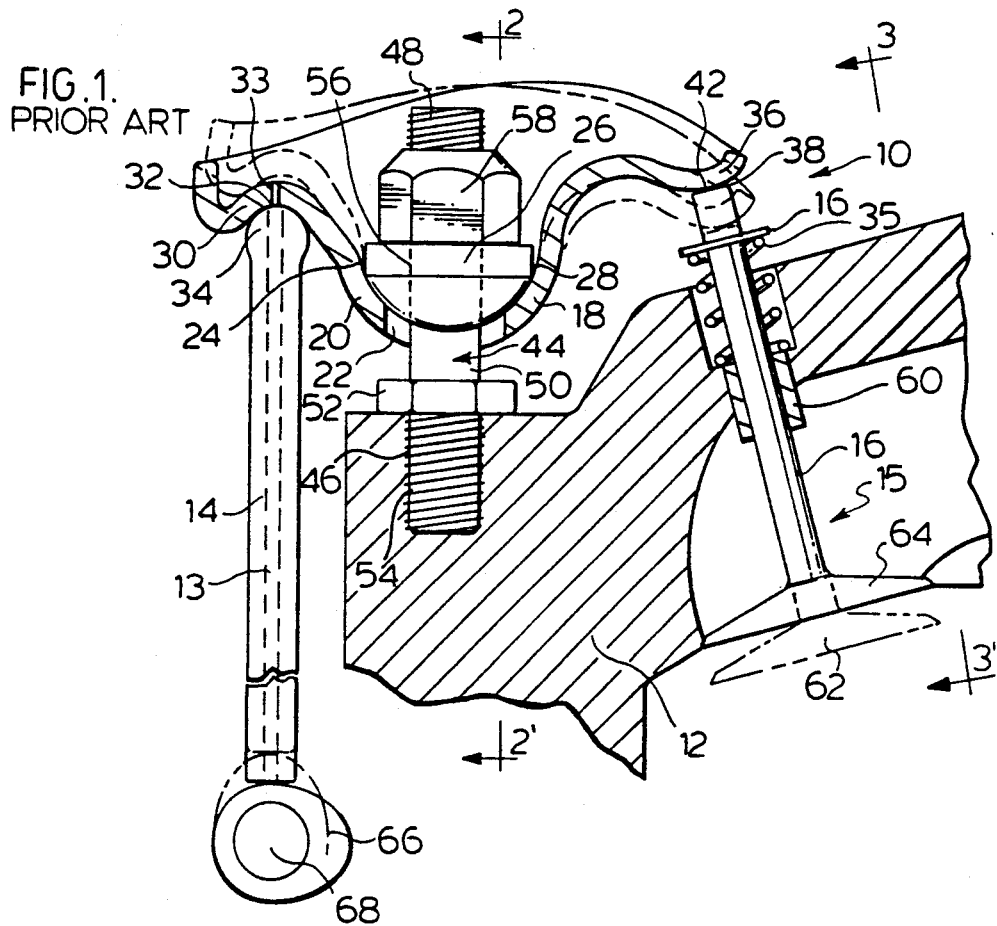
FIG. 1 is a simplified, schematic cross-sectional side view of a prior art rocker arm assembly.
Figure 2:
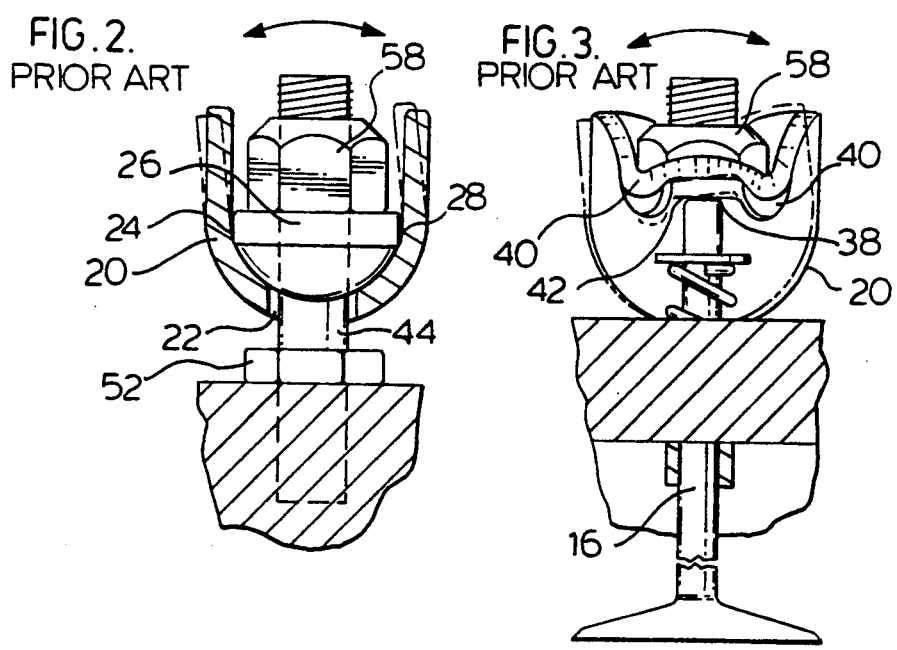
FIG. 2 is a schematic partially cut-away section on the line 2—2' of FIG. 1.
Figure 3:
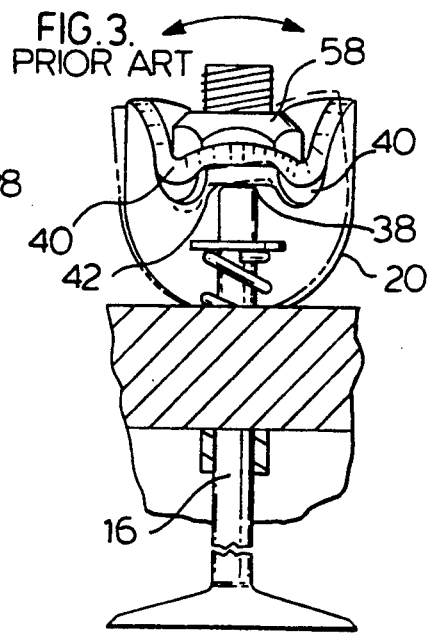
FIG. 3 is a schematic partially cut-away section on the line 3—3' of FIG. 1.

Reference is now made to FIGS. 1 to 3 schematically showing a known rocker arm assembly, shown generally as 10, retained on engine head 12 and mated with pushrod 14 and valve stem 16.

The prior art rocker arm assembly 10 includes a rocker arm 18, a retaining stud 44, a positioning nut 58 and bearing 26. The rocker arm 18 has a first end 30 to engage a pushrod 14 and a second end 36 to engage a valve stem 16. In between its two ends 30 and 36, the rocker arm 18 has a socket-forming recess 20 with an aperture 22 therethrough. As seen in FIG. 1, stud 44 is secured to engine head 12 with the stud 44 passing through the aperture 22. Positioning nut 58 retains the bearing 26 on the stud inside the socket-forming recess 20. The socket-forming recess 20 has inwardly disposed surface 28 complementary to outwardly directed, lower generally spherical surface 24 on bearing 26 such that the recess 20 and bearing 26, in effect, form a ball-in-socket coupling permitting the rocker arm 18 to pivot relative to stud 44 between the positions shown in solid and dotted lines in FIG. 1.

As is well known, the rocker arm 18 is pivoted cyclically in the operation of an internal combustion engine so as to open or close a valve generally indicated 15 to permit gases to enter or exit a combustion chamber synchronously with the reciprocal movement of a piston in the chamber. In this regard, as schematically shown in FIG. 1, pushrod 14 is cyclically moved up and down by cam 66 on a camshaft 68 connected to the engine's crankshaft (not shown). The coupling of the pushrod 14 via the rocker arm 18 to valve stem 16 controls the opening and closing of valve 15.

Valve 15 is schematically shown in FIG. 1 to have a valve stem 16 slidably received within valve guide 60 within engine head 12 such that a valve head 62 is seatable in valve seat 64 at the entrance to a combustion chamber. Valve spring 35 is provided to bias the valve to a closed position shown in solid lines with the valve head 62 seated in valve seat 64. Spring 35 is shown schematically as acting on a flange on valve stem 16 for clarity and actual valve returning spring systems are well known.

Rocker arm 18 has its first end 30 provided with a semi-spherical recess 32, adapted to receive spherical head 34 of pushrod 14. Rocker arm 18 at its other second end 36 has a relatively broad, gently convexly-curved surface 38 provided between a pair of raised terminal portions 40. Surface 38 is adapted to engage head 42 of valve stem 16.

As is to be appreciated, the valve spring 35 biases the valve stem 16 into the second end 36 of rocker arm 18 and thereby urges the rocker arm 18 towards maintaining engagement between its first end 30 and the pushrod 14. Movement of pushrod 14 pivots the rocker arm 18 which, in turn, correspondingly moves the valve 15.

As is well known, typically, at least two such rocker arm assemblies are provided for each cylinder in an engine. Thus, the arrangement shown in FIG. 1 is one of a plurality of such rocker arm assemblies, twelve, for example, in a six cylinder engine of automobile and truck gasoline internal combustion engines. As is to be appreciated by persons skilled in the art, the schematic pushrod 14 typically has a hydraulic lifter at its lower end which serves to both transfer motion of the camshaft 68 to the pushrod 14 and to direct lubricating oil up through a hollow bore 13 inside the pushrod such that oil may pass out the end of the spherical head 24 of pushrod 14 and through an opening 33 in semi-spherical recess 32. This oil serves to drop down on and provide lubrication between the bearing 86 and the socket-forming recess 20.

The typical prior art retaining stud 44, shown in FIG. 1, has screw threads both at a first lower end 46 and at a second upper end 48 with an intervening smooth cylindrical portion 50 therebetween. Separating lower end 46 from smooth body portion 50 is an integrally-formed hexagonal boss 52. The stud 44 is screwed into threaded recess 54 of engine head 12 until boss 52 engages engine head 12.

The prior art bearing 26 has a coaxial cylindrical bore 56 therethrough sized so that the bearing is slidable on body portion 50 of stud 44. The axial location of bearing 26 on stud 44 is adjusted by the locking-type positioning nut 58.

As is well known and as best seen in FIG. 1, the aperture 22 is elongated towards each end of the rocker arm 18 so as, in a rough sense, to be substantially elliptically shaped with the larger axis of the ellipse being essentially parallel to a longitudinal axis through rocker arm 18. The aperture is provided with sufficient elongation to permit pivoting movement of arm 18 about stud 44 as is necessary. Further, the aperture is provided with sufficient width to permit slight transverse movement, i.e., sideways or rolling movement of rocker arm 18 about stud 44 as shown by the arrows in FIGS. 2 and 3 and as may be preferable.

Bearing 26 is retained within rocker arm 18 by nut 58 and has its outer surface 24 so shaped as to be essentially complementary with inner surface 28 of the socket-forming recess 20 as to provide a ball-in-socket joint for movement of rocker arm 18 relative to stud 44. However, in such prior art assemblies, there is unwanted friction between bearing surface 24 of the bearing 26 and inner surface 28 of the socket-forming recess 20.

Figure 6:
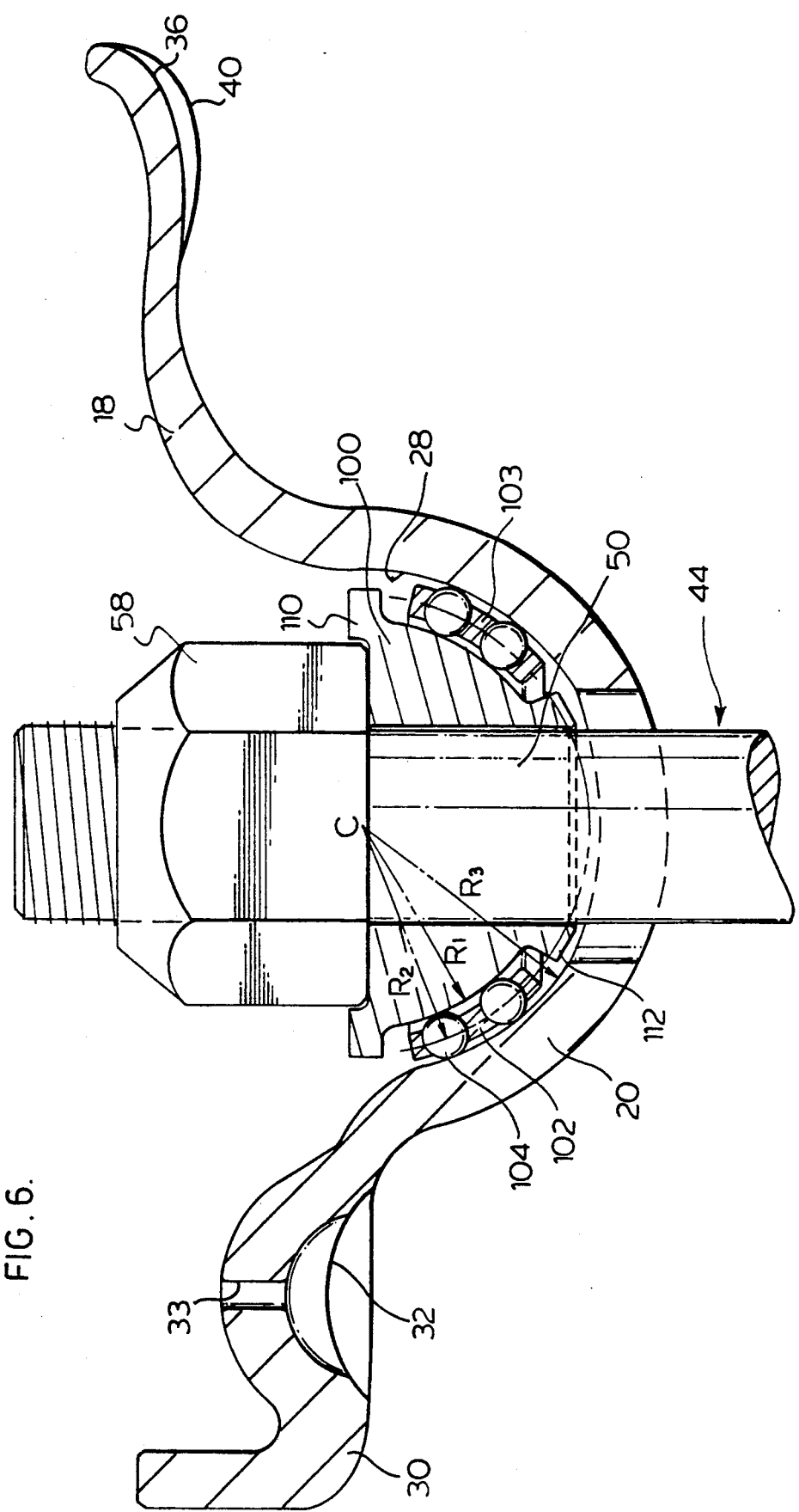
FIG. 6 is a schematic cross-sectional side view of the rocker arm assembly shown in FIG. 4.

Reference is now made to FIGS. 4 to 6 which show a first preferred embodiment of the present invention. In FIGS. 4 to 6, every element in the rocker arm assembly is the same as those illustrated in FIGS. 1 to 3 with the exception of the replacement of the prior art bearing 26 of FIGS. 1 to 3 by an inner bearing race 100 and a ring bearing 102.

Race 100 has a substantially semi-spherical shaped body 106 with a coaxial cylindrical hole 114 therethrough sized to closely fit about and slide over smooth cylindrical portion 50 of stud 44. The race 100 has an upper surface 70 with a hexagonal recess 72 formed therein. Recess 72 is sized to receive the lower portion of hexagonal positioning nut 58 therein so as to couple the race 100 to the nut 58 against relative rotation. With the lock-nut 58 locked to the stud 44 against rotation, as when the nut 58 is tightened onto the stud, the recess 72 secures the race 100 against rotation relative to the stud 44.

Race 100 has an outwardly directed bearing surface 108. This bearing surface 108 is spherically disposed, meaning, the surface lies in the plane of the surface of a sphere. The bearing surface 108 and hole 114 are coaxial in the sense that the bearing surface is axially centered about the hole. Bearing surface 108 is shown ending at the upper, larger end of the race 100 at an upper receiving lip 110 and at the lower, smaller end of the race at a lower receiving lip 112. While these lips are not necessary, they are of some assistance in locating the ring bearing 102 on the race 100 in assembly. The bearing surface 108 forms an outwardly directed frustospherical surface between the two lips 110 and 112.

Ring bearing 102, in effect, comprises a raceway or cage 103 consisting of a cullender-like wall 116 of uniform radial thickness in the form of a segment of a hollow sphere having a curved inwardly directed spherically disposed inner side surface 118 and a curved outwardly directed spherically disposed outer side surface 120. The cage 103 of the ring bearing 102 has a plurality of ball bearing receiving apertures 122 with each receiving a similar spherical, ball bearing or ball 104. Each ball 104 extends beyond both the inner side surface 118 and the outer side surface 120 into complementary engagement with the bearing surface 108 of the race 100 and into complementary engagement with the bearing surface 28 of the socket-forming recess 20 of the rocker arm 18. The bearing surface 28 of rocker arm 18 is preferably accurately formed as by machining to provide as accurately frustospherical surface.

As seen in FIG. 6, the centers of the balls 104 are retained in the cage 103 disposed in the plane of a spherical surface radius $R_2$ from common center C. Bearing surface 28 of the recess 20 of the rocker arm 18 lies in the plane of a spherical surface of radius $R_3$ from common center C. Bearing surface 108 of race 100 lies in the plane of a spherical surface of radius $R_1$ from common center C. The balls 104, in effect, space the bearing surface 28 from bearing surface 108 such that the difference between $R_1$ and $R_3$ is the diameter of the balls 104. The balls 104 are, in effect, located spacially in a part-spherical array between the bearing surfaces 28 and 108 to bear loading forces therebetween. The cage 103 may locate the ball 104 with sufficient freedom of movement that the balls 104 can accurately locate themselves between surfaces 28 and 108.

The operation of the first embodiment of the rocker arm assembly of FIGS. 4 to 6 is the same as with the prior art device of FIGS. 1 to 3, with the exception that frictional forces arising between the rocker arm 18 and stud 44 are reduced by reason of the balls 104.

Figure 7:
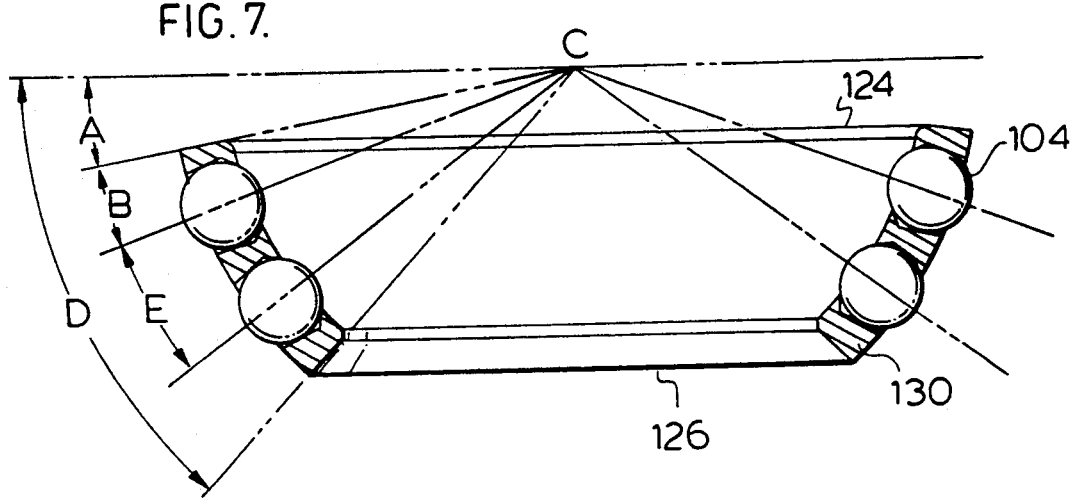
FIG. 7 is a schematic cross-sectional side view of the ring bearing of FIG. 6 along a diameter thereof.
Figure 9:
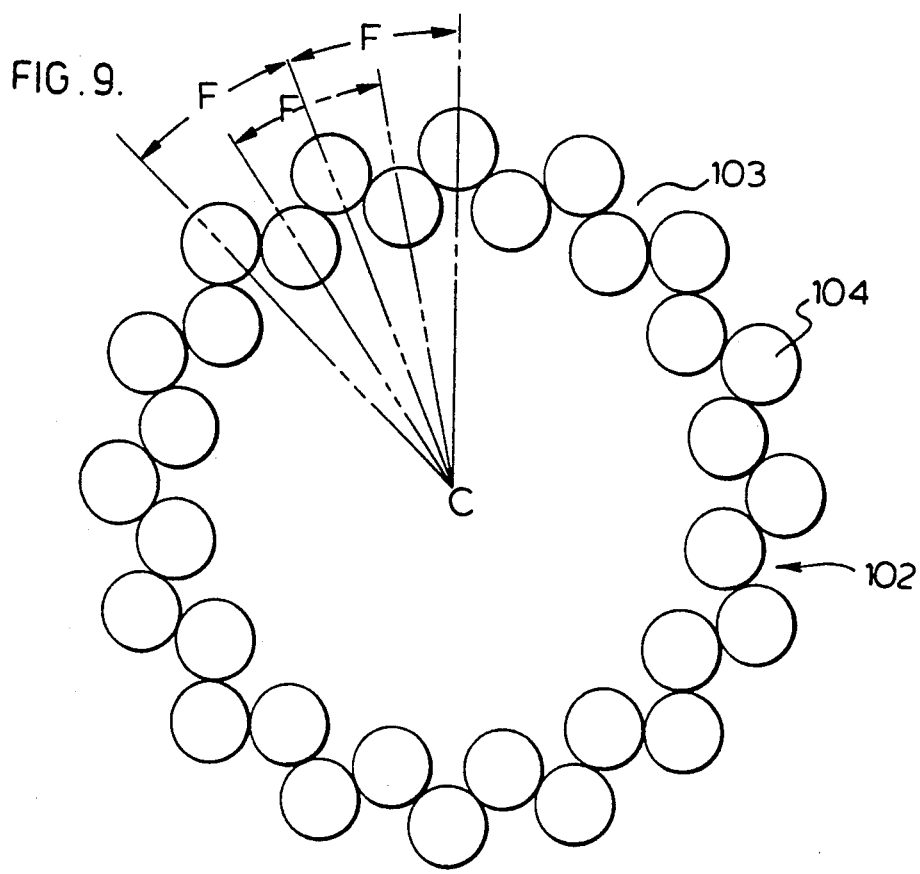
FIG. 9 is a top view of the ring bearing of FIG. 6.

Reference is now made to FIGS. 7 and 9 which show views of the ring bearing 102 of FIG. 4. FIG. 9 shows an actual top plan view of the ring bearing 102 of FIG. 4. As seen in FIG. 9, the balls 104 are located in two rows, as to concentric rings, with the balls 104 in each ring equally spaced at an angle F from each other and the balls 104 in one ring at angular locations in between balls 104 in the other ring. FIG. 7 schematically shows the ring bearing 102 of FIG. 4 in side view. FIG. 7 is schematic in the sense that it shows the balls in the two rows as lying in the same radial cross-section when properly only one ball would be seen. FIG. 7 shows the cage 103 as having an upper edge 124 and a lower edge 126 both appearing to be disposed horizontially in FIG. 7 which would arise with, for example, the upper edge 124 being located at a constant angle A from the horizontal and the lower edge being located at a constant angle D from the horizontal. In FIG. 7, the balls 104 in each ring are disposed at the same angle from the horizontal, that is, with a line drawn between the centers of the balls on each side of the cage 103 being horizontal.

The ring bearing 102 illustrated in FIGS. 4 to 7 and 9, may be seen to have its balls 104 arranged symmetrically with respect to the cage 103 and this is the preferred configuration. In FIGS. 7 and 9, the ball bearings are arranged in a spherical array symmetrically relative to each other and relative to the mass of the cage 103.

It is believed to be preferably that in use the ring bearing 102 rotates about the stud 44 relative to rocker arm 18 and, more preferably, that the ring bearing 102 rotates relative to both the rocker arm 18 and the race 100. If the ring bearing 102 does not rotate about stud 44 but rather the relative motion of the ring bearing 102 and rocker arm 18 are principally a linear motion in which they reciprocate back and forth relative to each other in the longitudinal direction of the rocker arm 18, then there is a risk of the balls 104 wearing grooves in the socket-forming recess 20 in this longitudinal direction. This could result in increased wear, heat and the likelihood of mechanical failure. It is believed that to the extent the rocker arm assembly is reasonably, accurately manufactured, for example, with the bearing surface 28 of rocker arm 18 accurately spherical; the bearing surface 108 of the race 100 accurately spherical; the balls accurately spherical and of the same size, and the bearing surface 28 and bearing surface 108 accurately co-spherical and spaced a distance equal to the radius of the balls as shown in FIG. 6: then ring bearing 102 will, in use, have an inherent tendency to rotate about stud 44. If, however, there may be imperfections in the diameter of the ball bearings, or if the bearing surfaces 28 or 108 may not be spherical or properly spaced, this may result in the ring bearing 102 tending to assume one position relative to the rocker arm leading to increased wear and possible failure.

The ball bearings 104 may be located in the ring bearing 102 in configurations which increase the inherent likelihood that the ring bearing 102 will rotate about stud 44. Such configurations include configurations in which a greater number of balls 104 contact the bearing surfaces asymmetrically about one or more diameters through the bearing surfaces or in which the balls 104 will have a tendency to contact the bearing surfaces at different relative locations on one side of the bearing surfaces compared to the other.

Figure 8:
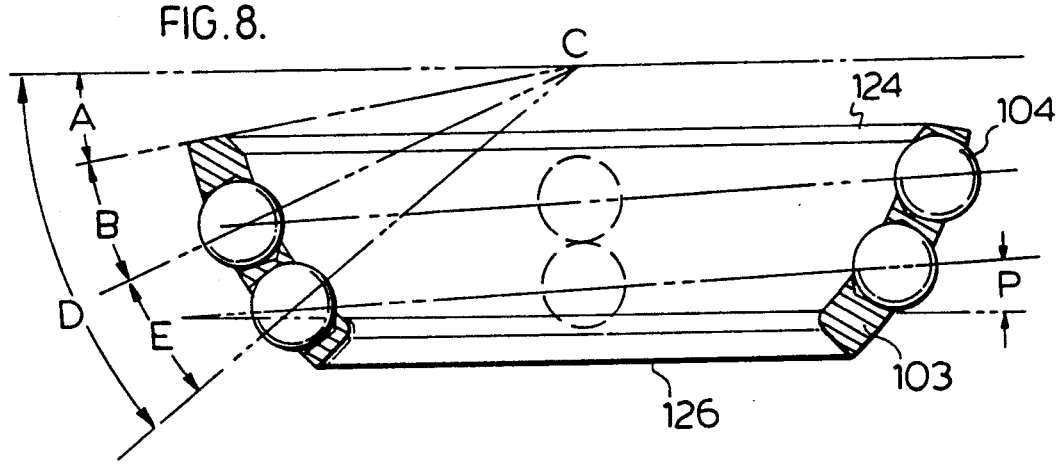
FIG. 8 is a schematic cross-sectional side view similar to FIG. 7 but of another angled embodiment of a ring bearing in accordance with the present invention.
Figure 10:
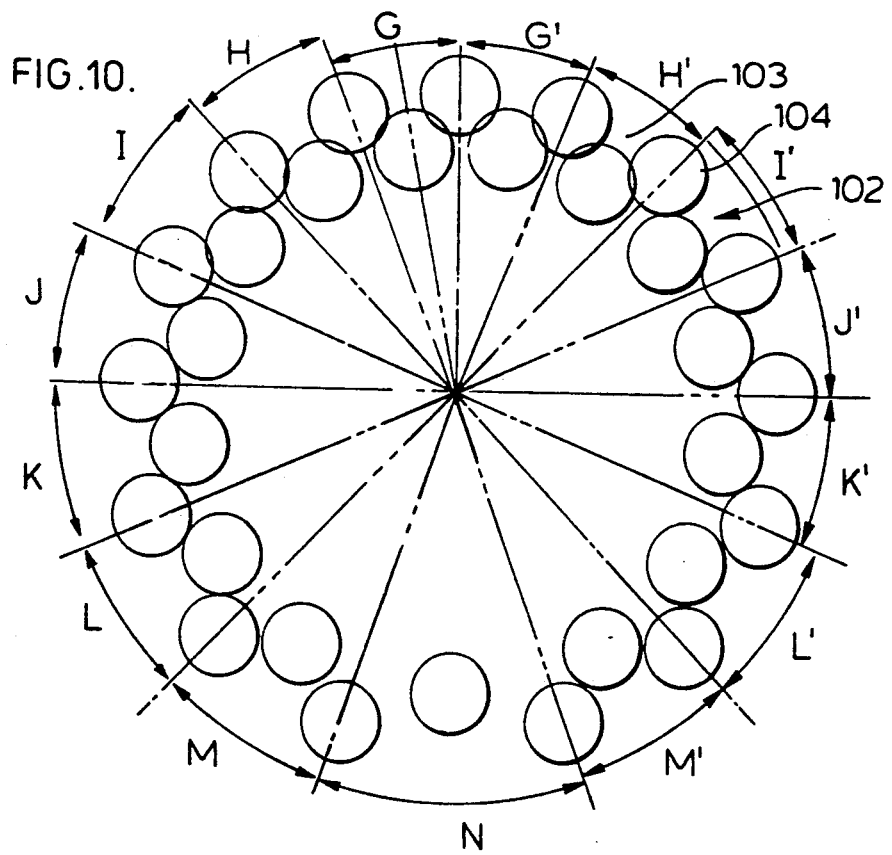
FIG. 10 is a top view similar to FIG. 9 but of another skewed embodiment of a ring bearing in accordance with the present invention.

Both FIGS. 8 and 10 show ball configurations which are believed to increase the inherent likelihood that ring bearing 102 will rotate about stud 44. FIG. 10 shows a plan view of a ring bearing 102 in which balls 104 are arranged in two concentric rings, however, with the spacing between balls in each ring increasing such that their angular locations of the outermost balls increase from spacing G to N. The balls 104 of the inner ring are disposed angularly halfway between the balls of the outer ring. The balls thus have a minimum spacing at the top of FIG. 4 and a maximum spacing at the bottom. A left to right diameter through FIG. 10 would have a greater number of balls in contact with the bearing surfaces over the top half of the ring bearing 102 of FIG. 10 as contrasted with the bottom half. In FIG. 10, the balls are asymmetrical about one diameter through the spherical array relative to each other whereby more balls would bear loading between the recess 20 and the race 100 on one side than on the other. FIG. 10 shows the angular spacing in which each of angles G to M are equal to angles G' to M'. However, it is to be appreciated that angle, for example, H, may not equal angle H' and the spacings between the two halves divided by a top to bottom diameter in FIG. 10 need not be symmetrical. Rather, having the angles G' to M' appearing differently than the angles G to M may further enhance the likelihood of the ring bearing 102 rotating.

FIG. 8 shows an embodiment virtually identical to that of FIG. 7, however, with the rings of the balls 104 disposed so as to be tilted at an angle to the edges 124 and 126 of cage 103. FIG. 8 depicts the cage 103 as having its upper edge 24 and lower edge 26 disposed horizontally exactly as in the manner of FIG. 7. In FIG. 8, the balls 104 in each of the two rows or rings lie in a plane tilted at an angle P to the horizontal. This has a result of having balls arranged asymmetrically compared to the mass of the cage 103. For example, as seen in FIG. 8, the cage 103 has a greater mass above the balls 104 on the left-hand side and a lesser mass below the balls 104 on the right-hand side. In FIG. 8, the balls are asymmetrical about one or more diameter through the spherical array whereby balls bear loading between the recess and the race at different locations on one side than on the other. The ring bearing 102 of FIG. 8 has a tendency when sitting in a notional, frictionless socket to assume a position in which the planes in which the balls lie will be tilted at an angle to the horizontal. This tilting is believed to enhance the inherent tendency of the ring bearing 102 to rotate as by the balls 104 engaging the bearing surfaces at opposite sides at different heights in the recess 20.

FIG. 8 shows the balls as lying in two rows or rings represented by two parallel planes. The balls of one row could lie in a plane which is at a different angle to the horizontal than the balls of the other row. Moreover, the rows, as seen in side view as in FIG. 8, need not lie in a flat plane. They may lie in a plane which may appear in side view as being curved or partially flat and partially curved or having some other configuration than flat or curved. For example, the balls could be placed in the cage 103 so as to form a spiral, for example, with a relative angular location of each ball, for example, angles A and B, increasing compared to its adjacent ball. With such a configuration, it may be possible to have, for example, the cage carry three balls on one side of the cage and only two balls on the other side of the cage or, alternatively, two balls on one side of the cage and only one ball on the other side of the cage.

As is to be appreciated, any combination of the embodiment shown in FIGS. 7, 8, 9 and/or 10, could be used. For example, a ring bearing could have a combination of the features of FIG. 8 and FIG. 10 and, effectively, the appearance shown in FIGS. 8 and 10 when seen in side and top views.

Figure 11:
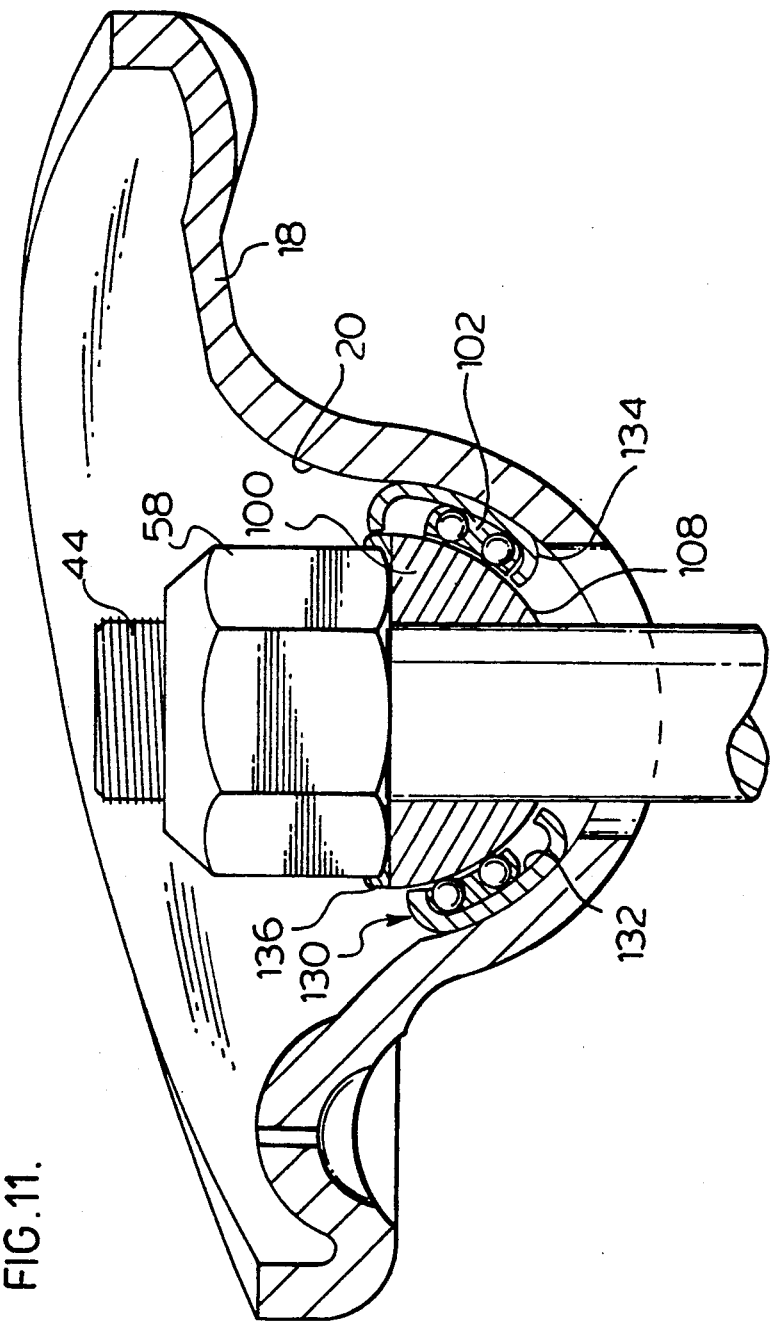
FIG. 11 is a cross-sectional side view of a second embodiment of a rocker arm assembly according to the invention.

Reference is made to FIG. 11 showing a second embodiment of a rocker arm assembly in accordance with the invention. The assembly of FIG. 11 is substantially the same as that in FIGS. 4 to 6 with the notable exception of the provision of an outer race 130 as a separate element received inside socket-forming recess 20 of rocker arm 18. The outer race 130 is a ring-like member with a C-shaped inwardly opening cross-section. This outer race 130 has an inner bearing surface 132 formed to be spherical, that is, as a part-spherical or frustopherical surface and serves the same function as bearing surface 28 in the first embodiment of FIGS. 4 to 6. Outer race 130 has an outer surface 134 to engage the inner surface 28 of the recess 20. Preferably, the outer race 130 is received in recess 20 against relative movement therein as, for example, by a snap or locking fit, although this is not necessary.

The embodiment of FIG. 11 has a ring bearing 102 identical to that shown with FIGS. 4 to 6, however, disposed between bearing surface 108 of inner race 100 and bearing surface 132 of outer race 130. Inner race 100 is functionally the same in the embodiment of FIG. 11 as in the embodiment of FIGS. 4 to 6. In FIG. 11, lips 110 and 112 are not provided on the inner race 100. As well, inner race 100 is shown welded to nut 58 by welds 136 so that the inner race 100 is fixed against rotation relative to nut 58. The embodiment of FIG. 11 can be useful to enable the surfaces 28 of recess 20 to only be roughly machined as in a stamping process leaving the separate and possibly easier to manufacture outer race 130 to be accurately machined and accurately provide a spherical bearing surface 132.

Figure 12:
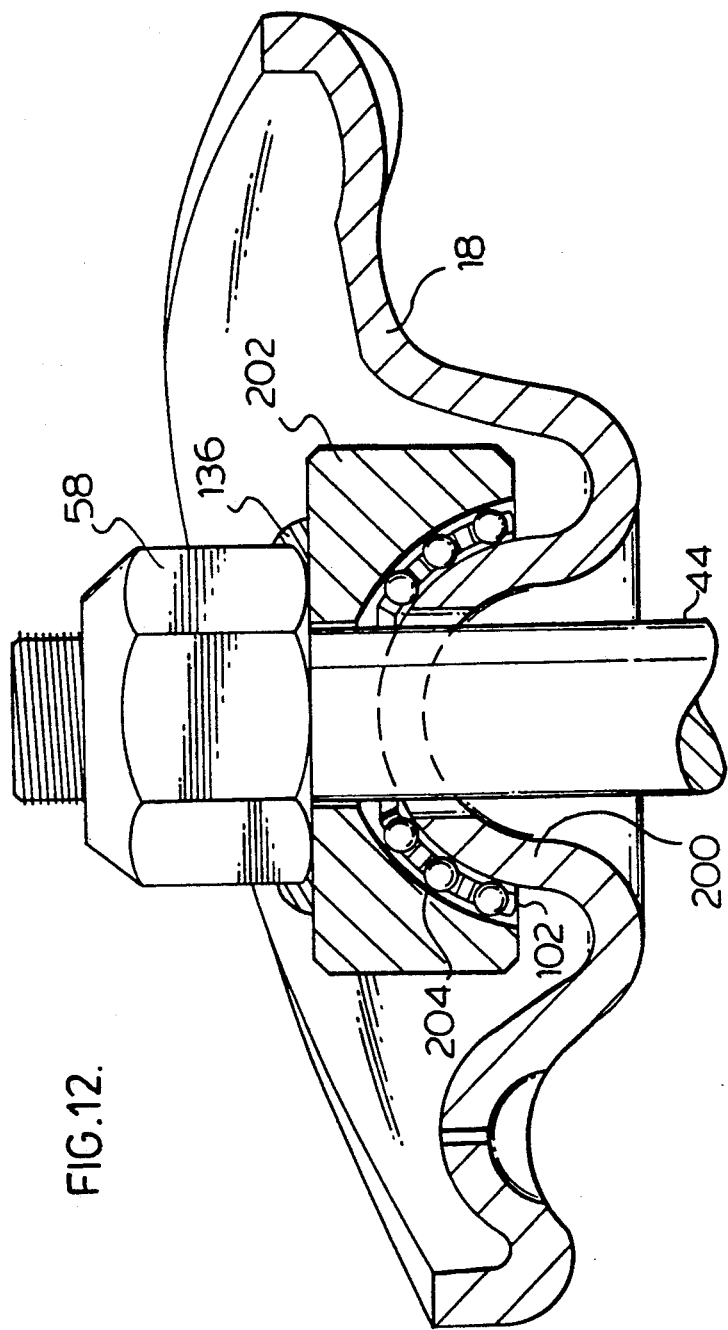
FIG. 12 is a cross-sectional side view of a third embodiment of a rocker arm assembly according to the invention.

Reference is made to FIG. 12 which shows a third embodiment of the invention which is equivalent in operation to the first embodiment of FIGS. 4 to 6, however, in which the rocker arm provides a domed center section 200 to form the part-ball member of a ball-in-socket joint. A race 202 has a socket-forming recess 204 with a ring bearing 102 similar to that in the first embodiment disposed between the domed section 200 and the recess 204. Operation of this third embodiment is substantially the same as with the first and second embodiments.

FIG. 4 shows a preferred configuration of the balls 104 in the ring bearing 102 in two staggered rows or rings. Insofar as the balls 104 are staggered in FIG. 4, FIGS. 5, 6, 7 and 8 imperfectly show the location of balls 104 in both rings as being in the same cross-section whereas, correctly, a cross-section along any radius would only show one ball 104 on each side. FIGS. 5, 6, 7 and 8 have been inaccurately drawn to assist easy understanding. Similarly, in the embodiments of FIGS. 11 and 12, the balls 104 have been shown with centers in the same cross-section when staggered arrangements of ball bearings in two or more rings is preferred. The balls 104 need not be staggered.

The embodiment of FIGS. 4 to 8 shows ring bearing 102 as having 32 ball bearing receiving apertures 122 in two staggered rings, each receiving a similar ball 104. While this arrangement is preferred, two or more rings could be provided. The embodiment of FIG. 12 shows three rings of balls.

The rocker arm shown in FIGS. 1, 4, 11 and 12 preferably is formed from metal by stamping. In the case of the embodiments of FIGS. 4 and 8, if desired, after stamping, the recess 20 may be machined and/or polished to provide inwardly directed side surface 28 accurately spherically disposed.

The cage 103 of ring bearings 102 shown in FIGS. 4 to 12 is preferably formed from a suitable metal such as brass. The balls are preferably steel. The apertures 122 in cage 103 may be formed in a known manner such as by drilling holes and, after the ball bearings are inserted, providing upsets around the edge of each aperture 122 to retain the balls 104. The number and size of the balls 104 and the extent they extend from cage 103 can be readily selected by a person skilled in this art. The freedom of the balls to move and rotate within their aperture 122 can be varied.

In overview of the three preferred embodiments, each preferred embodiment may be seen to have, in effect, a ball-in-socket-like arrangement. For example, in FIG. 6, the recess 20 forms a socket, the race 100 a part-ball-like member with the ring bearing 102 therebetween. In FIG. 11, the recess 20 together with outer race 130 effectively form a socket in which inner race 100 is the part-ball member. In FIG. 12, domed section 200 of rocker arm 18 effectively forms a part-ball member within socket-forming recess 204 of race 202.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein. Many modifications and improvements will now occur to those skilled in this art. For a definition of the invention, reference is made to the following claims.

We claim:

1. A rocker arm assembly for an internal combustion engine comprising:
   an elongate rocker arm having a pushrod engaging portion proximate one end, a valve stem engaging portion proximate its other end, and a socket-forming recess inbetween the ends with an aperture therethrough;
   first inwardly directed spherically disposed bearing surfaces in the recess about the aperture,
   retaining stud means extending through the aperture,
   part-ball-means retained on the stud means within the socket-forming recess and having second outwardly directed spherically disposed bearing surfaces in the recess about the stud means, ring bearing means disposed about the stud means sandwiched between the part-ball-means and the socket-forming recess, the ring bearing means comprising a raceway having an outwardly directed side surface and an opposite inwardly directed side surface, the raceway securing a plurality of ball bearings therein with ball bearings extending from at least one of the outwardly and inwardly directed side surfaces of the raceway into complementary engagement with at least one of the first and second bearing surfaces to guide the rocker arm in pivotal motion relative to the retaining stud means.

2. A rocker arm assembly as claimed in claim 1 wherein the ball bearings are of similar diameter and the ball bearings are received in the raceway with centers of the ball bearings disposed in a plane of a spherical surface.

3. A rocker arm assembly as claimed in claim 2 wherein the raceway comprises a wall in the form of a segment of a hollow sphere and having a central bore about the retaining stud means.

4. A rocker arm assembly as claimed in claim 3 wherein the wall has a plurality of ball bearing retaining openings extending therethrough with one of said ball bearings received against removal in each opening but rotatable therein.

5. A rocker arm assembly as claimed in claim 4 wherein said retaining stud means comprises a cyclindrical stud with a threaded end and a locking nut threaded on the threaded end of the stud on a side of the part-ball-means remote from the recess to retain and adjustably locate the part-ball-means on the stud.

6. A rocker arm assembly as claimed in claim 5 wherein said part-ball-means is coupled to the stud means to prevent relative rotation.

7. A rocker arm assembly as claimed in claim 6 wherein said aperture in the rocker arm is elongated towards the ends of the rocker arm.

8. A rocker arm assembly as claimed in claim 1 wherein the raceway secures the plurality of ball bearings therein with each ball bearing extending from both the outwardly and inwardly directed side surfaces of the raceway into complementary engagement with the first bearing surfaces and the with the second bearing surfaces.

9. In a rocker arm assembly for an internal combustion engine comprising:

an elongate rocker arm having a pushrod engaging portion proximate one end, a valve stem engaging portion proximate its other end, and a socket-forming recess inbetween the ends with an aperture therethrough, retaining stud means extending through the aperture, part-ball-means retained on the stud means within the socket-forming recess and forming with the recess a ball-in-socket type coupling of the rocker arm and stud means for relative articulated movement, the improvement wherein a plurality of ball bearings are arranged in a part-spherical array to bear loading between the recess and the part-ball means.

10. The improved rocker arm assembly of claim 9 wherein the part-ball-means has an outwardly directed frustospherical surface coaxially about the stud means engaged by the ball bearings.

11. The rocker arm assembly of claim 9 wherein the recess has an inwardly directed frustospherical surface coaxially about the aperture engaged by the ball bearings.

12. The rocker arm assembly of claim 10 wherein the recess has an inwardly directed frustospherical surface coaxially about the aperture engaged by the ball bearings.

13. The rocker arm assembly as claimed in claim 10 wherein the ball bearings are retained in the part spherical array in a ring-like raceway disposed coaxially about the retaining stud means.

14. The rocker arm assembly as claimed in claim 12 wherein the ball bearings are retained in the part spherical array in a ring-like raceway disposed coaxially about the retaining stud means.

15. A rocker arm assembly as claimed in claim 13 wherein the ball bearings are arranged in the spherical array symmetrically relative to each other in one or more rings.

16. A rocker arm assembly as claimed in claim 13 wherein the ball bearings are arranged in the spherical array asymmetrically about one or more diameters through the spherical array relative to each other.

17. A rocker arm assembly as claimed in claim 13 wherein the ball bearings are arranged in the spherical array asymmetrically about one or more diameters through the spherical array whereby more ball bearings bear loading between the recess and the part-ball means on one side thereof than on the other.

18. A rocker arm assembly as claimed in claim 13 wherein the ball bearings are arranged in the spherical array with more ball bearings bearing loading between the recess and the part-ball-means on one side thereof than on the other.

19. A rocker arm assembly as claimed in claim 13 wherein the ball bearings are arranged in the spherical array asymmetrically about one or more diameters through the spherical array relative to the mass of the raceway.

20. A rocker arm assembly as claimed in claim 13 wherein the ball bearings are arranged in the spherical array asymmetrically about one or more diameters through the spherical array whereby ball bearings bear loading between the recess and the part-ball means at different relative locations on one side thereof than on the other.

21. In a rocker arm assembly for an internal combustion engine comprising:

an elongate rocker arm having a pushrod engaging portion proximate one end, a valve stem engaging portion proximate its other end, and a part-ball-forming dome portion inbetween the ends with an aperture therethrough, retaining stud means extending through the aperture, socket-forming means retained on the stud means about the dome portion and forming with the dome portion a ball-in-socket type coupling of the rocker arm and stud means for relative articulated movement, the improvement wherein a plurality of ball bearings are arranged in a part-spherical array to bear loading between the dome portion and the socket-forming means.

* * * * *